(12) United States Patent
Seal et al.

(10) Patent No.: US 9,388,074 B2
(45) Date of Patent: *Jul. 12, 2016

(54) STRUCTURAL MATERIALS WITH NEARLY ZERO CARBON EMISSIONS

(75) Inventors: Sudipta Seal, Orlando, FL (US); Larry L. Hench, Ft. Meyers, FL (US); Suresh Babu Krishna Moorthy, Orlando, FL (US); David Reid, Oviedo, FL (US); Ajay Karakoti, Richland, WA (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1000 days.

This patent is subject to a terminal disclaimer.

(21) Appl. No.: 12/746,781

(22) PCT Filed: Dec. 16, 2008

(86) PCT No.: PCT/US2008/013734
§ 371 (c)(1),
(2), (4) Date: Nov. 29, 2010

(87) PCT Pub. No.: WO2009/082442
PCT Pub. Date: Jul. 2, 2009

(65) Prior Publication Data
US 2011/0112272 A1    May 12, 2011

Related U.S. Application Data

(60) Provisional application No. 61/015,418, filed on Dec. 20, 2007.

(51) Int. Cl.
*C08G 79/00* (2006.01)
*C07F 5/06* (2006.01)
(Continued)

(52) U.S. Cl.
CPC ............ *C04B 12/005* (2013.01); *C04B 7/243* (2013.01); *C04B 2111/00017* (2013.01); *Y02P 40/145* (2015.11); *Y02P 40/165* (2015.11)

(58) Field of Classification Search
CPC ............... C04B 12/005; C04B 2111/00017; C04B 7/243
USPC ........................................................ 106/405
See application file for complete search history.

(56) References Cited

U.S. PATENT DOCUMENTS 3,765,920 A * 10/1973 Humphrey .................... 106/405
3,950,470 A    4/1976 Davidovits ................... 264/113
(Continued)

FOREIGN PATENT DOCUMENTS

AU    2008341102    7/2009
BR    PI0822065-4    7/2009
(Continued)

OTHER PUBLICATIONS

Thongsang et al.; "Effect of NaOH and Si69 Treatments on the Properties of Fly Ash/Natural Rubber Composites"; Polymer Composites—2006.*

(Continued)

*Primary Examiner* — Shuangyi Abu Ali
(74) *Attorney, Agent, or Firm* — Ballard Spahr LLP

(57) ABSTRACT

Processes and methods of making and preparing, compositions and structural products therefrom are provided, whereby the surface area of alumino-silicate based powders is greatly increased and rendered chemically active so that when the functionalized powders are mixed with water poly-condensation reactions occur between the surfaces binding the powders together to form a structural material with negligible emission of carbon compounds. In another embodiment, the surface functionalized powders can be mixed with an additive; a dry aggregate, such as sand and water to make a slurry that can be poured or cast into any desired shape and rapidly cured to a hardened shape suitable for use as a structural material with the mechanical strength equivalent to Portland-cement based concrete products. In additional embodiments, the alumino-silicate based powders are nano-functionalized and foam functionalized to provide light weight and structurally strong materials that can also be used in combination with or as replacement for Portland-cement.

3 Claims, 17 Drawing Sheets

(51) Int. Cl.
  B82Y 40/00   (2011.01)
  C04B 12/00   (2006.01)
  C04B 7/24    (2006.01)
  C04B 111/00  (2006.01)

(56) References Cited

U.S. PATENT DOCUMENTS

| 5,147,829 | A | 9/1992 | Hench | 501/12 |
| 5,342,595 | A | 8/1994 | Davidovits | 423/328.1 |
| 6,802,898 | B1 | 10/2004 | Liskowitz | 106/705 |
| 8,404,609 | B2 * | 3/2013 | Seal et al. | 502/60 |
| 2006/0155376 | A1 | 7/2006 | Asgari | |
| 2007/0142505 | A1 | 6/2007 | Ueta et al. | |
| 2007/0184394 | A1 | 8/2007 | Comrie | |

FOREIGN PATENT DOCUMENTS

| CA | 2712575 | 7/2009 |
| CN | 101977868 | 7/2009 |
| EP | 8864380.4 | 7/2009 |
| HK | 11108433.5 | 7/2009 |
| IL | 205996 | 7/2009 |
| IN | 2042/KOLNP/2010 | 7/2009 |
| JP | 2008-297148 A | 12/2008 |
| JP | 2011-523392 | 7/2009 |
| KR | 10-2010-7012631 | 7/2009 |
| MX | MX/a/2010/006298 | 7/2009 |
| RU | 2010130262 | 7/2009 |
| SG | 201004079-8 | 7/2009 |
| WO | WO 2009/082442 | 7/2009 |

OTHER PUBLICATIONS

PCT/US2008/013734 International Search Report and the Written Opinion of the International Searching Authority, or the Declaration, mailed Feb. 10, 2009.
Czurda KA, et al. Reactive barriers with fly ash zeolites for in situ groundwater remediation, Applied Clay Science 21(1-2), pp. 13-20 (2001).
Davidovits J. Synthesis of new high temperature geopolymers for reinforced plastics/composites, Proc PACTEC 79, Society of Plastic Engineers, pp. 151-174 (1979).
Fernandez-Jimenez, et al. Microstructure development of alkali-activated fly ash cement: a descriptive model, Cement and Concrete Research 35(6), pp. 1204-1209 (2005).
Hua & Deventer. The geo-polymerisation of alumino-silicate minerals, Intl J Min Process 59, pp. 247-266 (2000).
Madani A, et al. Si-29 and Al-27 NMR-study of zeolite formation from alkali-leached kaolinites—influence of thermal preactivation, J Phys Chem 94(2), pp. 760-765 (1990).
Nilsen, et al. Preparation and characterization of binder for inorganic composites made from amorphous mineral raw material, J Sol-Gel Sci Technol 35(2), pp. 143-150 (2005).
Popovics S. Strength relationships for fly ash concrete, Am Concrete Inst J 79, pp. 43-49 (1982).
Rahier H, et al. Low-temperature synthesized aluminosilicate glasses, Chapter 3. Influence of the Composition of the Silicate Solution on Production, Structure and Properties, J Mater Sci 32(9), pp. 2237-2247 (1997).
Ravindrarajah & Tam. Fly ash, silica fume, slag, and natural pozzolans in concrete, SP-114, American Concrete Institute, Detroit, pp. 139-155 (1989).
van Jaarsveld, et al. Effect of the alkali metal activator on the properties of fly-ash based geopolymers, Ind Eng Chem Res 38(10), pp. 3932-3941 (1999).
van Jaarsveld, et al. The effect of composition and temperature on the properties of fly ash and kalonite-based geopolymers, Chem Eng J 89 (1-3), pp. 63-73 (2002).
Woolard, et al. The use of a modified fly ash as an absorbent for lead, Water SA 26(4), pp. 531-536 (2000).
International Preliminary Report on Patentability issued on Jun. 22, 2010 by the International Bureau for PCT/US2008/013734 (Applicant—University of Central Florida Research Foundation // 1st Named Inventor—Seal) (6 pages).
Claims Amendment filed Sep. 3, 2010 with the European Patent Office for Application EP2222611 filed Dec. 16, 2008 (Applicant—University of Central Florida Research Foundation // 1st Named Inventor—Seal) (13 pages).
Supplementary European Search Report issued Aug. 1, 2012 by the European Patent Office for Application EP2222611 filed Dec. 16, 2008 (Applicant—University of Central Florida Research Foundation // 1st Named Inventor—Seal) (7 pages).
Invitation to Respond to Written Opinion issued Sep. 23, 2011 by the Intellectual Property Office of Singapore for Application 201004079-8 filed Dec. 16, 2008 (Applicant—University of Central Florida Research Foundation // 1st Named Inventor—Seal) (9 pages).
Response to Written Opinion filed Feb. 22, 2012 with the Intellectual Property Office of Singapore for Application 201004079-8 filed Dec. 16, 2008 (Applicant—University of Central Florida Research Foundation // 1st Named Inventor—Seal) (9 pages).
Examination Report issued Sep. 6, 2012 by the Intellectual Property Office of Singapore for Application 201004079-8 filed Dec. 16, 2008 (Applicant—University of Central Florida Research Foundation // 1st Named Inventor—Seal) (8 pages).
Office Action issued May 3, 2012 by the Chinese Patent Office for Application 200880121388 filed Dec. 16, 2008 (Applicant—University of Central Florida Research Foundation // 1st Named Inventor—Seal) (12 pages).
Response to Office Action filed Nov. 18, 2012 with the Chinese Patent Office for Application 200880121388 filed Dec. 16, 2008 (Applicant—University of Central Florida Research Foundation // 1st Named Inventor—Seal) (12 pages).
Notice of Rejection issued Dec. 14, 2011 by the Korean Patent Office for Application 10-2010-7012631 filed Dec. 16, 2008 (Applicant—University of Central Florida Research Foundation // 1st Named Inventor—Seal) (7 pages).
Yuasa, et al., "Fundamental Study on Improvement in Activity of Fly Ash, 'Part I: Investigation on Physical and Chemical Modification Methods, and Effect as Additives'", Architectural Institute of Japan Summaries of Technical Papers of Annual Meeting, Japan Architectural Institute of Japan, Aug. 2007, (Original—2 pages // Machine Translation—2 pages).
First Patent Examination Report issued on Apr. 19, 2013 by the Australian Patent Office for application 2008341102, filed on Dec. 20, 2007 (Applicant—U. of Central Florida Research Foundation, Inc., et al. // Inventor—Seal, et al.) (4 pages).
Response to First Patent Examination Report filed on Dec. 2, 2014 by the Australian Patent Office for application 2008341102, filed on Dec. 20, 2007 (Applicant—U. of Central Florida Research Foundation, Inc., et al. // Inventor—Seal, et al.) (12 pages).
Second Patent Examination Report issued on Dec. 5, 2014 by the Australian Patent Office for application 2008341102, filed on Dec. 20, 2007 (Applicant—U. of Central Florida Research Foundation, Inc., et al. // Inventor—Seal, et al.) (4 pages).
Notice of Grant issued on May 14, 2015 by the Australian Patent Office for application 2008341102, filed on Dec. 20, 2007 (Applicant—U. of Central Florida Research Foundation, Inc., et al. // Inventor—Seal, et al.) (2 pages).
Office Action issued by the Canadian IP Office on May 7, 2015 for application 2712575, filed on Dec. 17, 2008 (Applicant—U. of Central Florida Research Foundation, Inc., et al. // Inventor—Seal, et al.) (4 pages).
Response, filed on Nov. 5, 2015, to Office Action issued by the Canadian IP Office on May 7, 2015 for application 2712575, filed on Dec. 17, 2008 (Applicant—U. of Central Florida Research Foundation, Inc., et al. // Inventor—Seal, et al.) (18 pages).
First Office Action issued on May 3, 2012 by the SIPO for application CN 200880121388.3, filed on Feb. 16, 2011 (Applicant—U. of Central Florida Research Foundation, Inc., et al. // Inventor—Seal, et al.) (Original—5 pages // Translation—8 pages).

(56) References Cited

OTHER PUBLICATIONS

Second Office Action issued on Mar. 13, 2013 by the SIPO for application CN 200880121388.3, filed on Feb. 16, 2011 (Applicant—U. of Central Florida Research Foundation, Inc., et al. // Inventor—Seal, et al.) (Original—9 pages // Translation—11 pages).

Response to Second Office Action issued on Mar. 13, 2013 by the CIPO for application CN 200880121388.3, filed on Feb. 16, 2011 (Applicant—U. of Central Florida Research Foundation, Inc., et al. // Inventor—Seal, et al.) (Original and Translation—15 pages total).

Third Office Action issued on Dec. 5, 2013 by the SIPO for application CN 200880121388.3, filed on Feb. 16, 2011 (Applicant—U. of Central Florida Research Foundation, Inc., et al. // Inventor—Seal, et al.) (Original—23 pages // Translation—14 pages).

Decision on Rejection issued on Jul. 22, 2014 by the SIPO for application CN 200880121388.3, filed on Feb. 16, 2011 (Applicant—U. of Central Florida Research Foundation, Inc., et al. // Inventor—Seal, et al.) (Original—9 pages // Translation—14 pages).

Notice of Reexamination issued on Dec. 24, 2015 by the SIPO for application CN 200880121388.3, filed on Feb. 16, 2011 (Applicant—U. of Central Florida Research Foundation, Inc., et al. // Inventor—Seal, et al.) (Original—3 pages // Translation—6 pages).

Reponse to Extended European Search Report filed on Feb. 28, 2013 for application EP 08864380.4, filed on Dec. 16, 2008 (Applicant—U. of Central Florida Research Foundation, Inc., et al. // Inventor—Seal, et al.) (13 pages).

Communication pursuant to Article 94(3) EPC issued on Sep. 2, 2013 for application EP 08864380.4, filed on Dec. 16, 2008 (Applicant—U. of Central Florida Research Foundation, Inc., et al. // Inventor—Seal, et al.) (4 pages).

Reponse to Communication pursuant to Article 94(3) EPC issued on Sep. 2, 2013 for application EP 08864380.4, filed on Dec. 16, 2008 (Applicant—U. of Central Florida Research Foundation, Inc., et al. // Inventor—Seal, et al.) (3 pages).

Communication pursuant to Article 94(3) EPC issued on Jan. 5, 2015 for application EP 08864380.4, filed on Dec. 16, 2008 (Applicant—U. of Central Florida Research Foundation, Inc., et al. // Inventor—Seal, et al.) (3 pages).

Response to Communication pursuant to Article 94(3) EPC issued on Jan. 5, 2015 for application EP 08864380.4, filed on Dec. 16, 2008 (Applicant—U. of Central Florida Research Foundation, Inc., et al. // Inventor—Seal, et al.) (4 pages).

Communication pursuant to Article 94(3) EPC issued on Oct. 22, 2015 for application EP 08864380.4, filed on Dec. 16, 2008 (Applicant—U. of Central Florida Research Foundation, Inc., et al. // Inventor—Seal, et al.) (3 pages).

Official Action issued by the JPO on Mar. 19, 2013 for application JP 2010539449 (Applicant—U. of Central Florida Research Foundation, Inc., et al. // Inventor—Seal, et al.) (Original—4 pages // Translation—7 pages).

Last Official Action issued by the JPO on Jul. 8, 2014 for application JP 2010539449 (Applicant—U. of Central Florida Research Foundation, Inc., et al. // Inventor—Seal, et al.) (Translation—6 pages).

\* cited by examiner

STRUCTURAL MATERIALS WITH NEARLY ZERO CARBON EMISSIONS

CROSS-REFERENCE TO RELATED APPLICATION

This is a national stage application of PCT/US2008/013734, filed Dec. 16, 2008 and published in English, which claims priority from U.S. Provisional Application Ser. No. 61/015,418, filed Dec. 20, 2007, hereby incorporated by reference.

This invention claims the benefit of priority from U.S. Provisional Patent Application Ser. No. 61/015,418 filed Dec. 20, 2007, the content of which is incorporated herein by reference.

FIELD OF THE INVENTION

This invention relates to structural materials and, in particular to, processes and methods of making and preparing products and compositions of functionalized and nano-functionalized alumino-silicate raw materials with properties equivalent to Portland cement-based concrete products or mortars wherein the alumino-silicate raw materials are manufactured with negligible emission of carbon compounds that are characteristic of the manufacture of Portland cement.

BACKGROUND AND PRIOR ART

Increase of carbon dioxide in the environment has been associated with the onset of global warming, the greenhouse effect. Portland cement manufacture is a very large contributor to the carbon dioxide emissions with approximately 0.9 ton of carbon dioxide emitted for every ton of cement made. Concrete is second only to water as the most consumed substance in the world (hundreds of millions of tons worldwide) and Portland cement, with its huge carbon footprint, is the principal ingredient in concrete.

The chemical process of making Portland cement is the reaction of limestone (calcium carbonate) with clay (hydrated alumino-silicate) at high temperatures. This elevated chemical reaction, called calcination, releases carbon dioxide to the atmosphere at a very high rate, for example, about 60% of the emissions from a cement plant. The high temperatures used for calcination reactions require combustion of carbon based fuels and are responsible for about 40% of the emissions of the cement plant.

The above mentioned factors associated with Portland cement manufacture cannot be replaced so there is little that can be done to reduce carbon dioxide emissions from a cement plant. Thus, there is great need for an alternative to Portland cement based concrete as a structural building material.

Numerous approaches have been tried with various degrees of success. Fly ash, a by-product of coal burning power plants is produced worldwide in large quantities annually; e.g., hundreds of millions of tons. Fly ash can be added to concrete mixtures but only about 10% of the fly ash produced annually is used in concrete for various reasons. A critical drawback of the use of fly ash in concrete is that initially the fly ash significantly reduces the compressive strength of the concrete as discussed by Ravindrarajah and Tam in (1989). Fly ashes from different sources may have differing effects on concrete. Fly ash may behave differently depending on the type of Portland cement used (types I-IV) since they have different chemical compositions. (Popovics, 1982).

Liskowitz et al. in U.S. Pat. No. 6,802,898 B1, (2004) describes a method for preparing fly ash for high compressive strength concrete and mortar and shows that it is possible to increase the strength of concrete containing fly ash by grinding the fly ash to a desired size distribution and increasing the yield of fly ash that can be used in a specific mixture of concrete. However, the percentage of fly ash that can be used in a concrete mix with Portland cement even with grinding to a specific size distribution of particles is limited to 10-50%. The costs and maintenance of agglomerated free fly ash powders limits the use of this process. The concrete industry typically limits fly ash to less than 30% in concrete mixtures, thus, only a small fraction of concrete contains any fly ash.

Another alternative to reduce the use of Portland cement based concrete is to use a process termed geo-polymerization to manufacture structural building materials. These materials, called geo-polymers, are synthetic analogues of natural zeolitic materials, as reported by Davidovits, et al. in U.S. Pat. No. 5,342,595 (1994) and van Jaarsveld et al, in "The Effect of Composition and Temperature on the Properties of Fly Ash and Kaolinite-based Geopolymenrs, *Chemical Engineering Journal,* 89 (1-3), pages 63-73 (2002).

Geo-polymers are created by chemically dissolving silicon and aluminum-containing source materials at high pH in the presence of soluble alkali metal silicates. The three principal process steps are: 1) dissolution of the aluminum and silica containing raw materials to form mobile precursors through the complexing action of hydroxide ions, 2) partial orientation of mobile precursors as well a partial internal restructuring of the alkali polysilicates, 3) re-precipitation where the whole liquid system hardens to form an inorganic polymeric structure that can be amorphous or semi-crystalline.

In order to form the geo-polymerized structure, it is essential to dissolve completely the silicon and aluminum containing source materials according to van Jaarsveld, et al, 2002 supra. Geo-polymers do not utilize the formation of calcium-silica-hydrates for matrix formation and strength but instead depend on the polycondensation of solubilized silica and alumina precursors and high alkali content to attain structural strength.

Typical formulations of geo-polymers involve dissolution of fly ash and calcined kaolinite with various quantities of sodium or potassium silicate and sodium or potassium hydroxide. Strength of the resultant geo-polymer depends greatly upon fly ash/kaolinite ratio and calcination temperature (300-900 C) of the aluminum-silicate containing precursor (kaolinite) as reported by van Jaarsveld, et al, 2002 supra. It is possible to vary many geo-polymer process characteristics, such as ratios of clay to fly ash, calcination temperature of the clay, water/fly ash ratios, etc. However, the strength of such geo-polymer materials seldom is equivalent to Portland cement based structural materials; geo-polymer strengths are in the range of 5 to 11 MPa (725-1500 Psi) whereas Portland cement based concrete must be in the range of 20-40 MPa (3,000 to 6,000 Psi). Further discussion of geopolymers used or designed for structural materials is by Jaarsveld et al, in "The Effect of Alkali Metal Activator on the Properties of Fly-Ash Based Geopolymers," *Ind. Eng. Chem. Res,* 38 (10) (1999) 3932-3941; Madani A et al, "Si-29 and Al-27 NMR-Study of Zeolite Formation from Alkali-Leached Kaolinites—Influence of Thermal Preactivation," *Journal of Physical Chemistry* 94 (2):760-765 (1990); H. Rahier et al, "Low-Temperature Synthesized Aluminosilicate Glasses" Chapter 3. Influence of the Composition of the Silicate Solution on Production, Structure and Properties, *Journal of Materials Science* 32 (9): 2237-2247 (1997); J. Davidovits, "Synthesis of New High Temperature Geopolymers for Reinforced Plastics/Composites," *Proceedings of PACTEC 79, Society of Plastic Engineers,* 151-174 (1979); and J. Davidovits, "Process for the Fabrication of Sintered Panels and Panels Resulting from the Application of this Process," U.S. Pat. No. 3,950,470 (1976).

A related technology has been described by Nilsen et al in "Preparation and Characterization of Binder for Inorganic Composites made from Amorphous Mineral Raw Material, *Journal of Sol-Gel Science and Technology,* 35 (2), 143-150 (2005) for making an inorganic composite binder material through a sol-gel route using alumino-silicate amorphous mineral raw materials containing alkaline earth and transition metal oxides. The Nilsen et al method requires complete dissolution of the starting raw material in formic acid. The strengths that are developed are not sufficient for use in structural applications.

Another route used in chemical processing to produce structural materials that possess properties equivalent to Portland cement-based concrete without characteristic carbon dioxide emissions is to use sol-gel processing. Hench et al, in U.S. Pat. No. 5,147,829 disclose sol-gel derived SiO2 oxide powder composites and their production and discuss how to incorporate small oxide powders having a diameter size range between approximately 0.001 to approximately 10 microns in a silica based sol to form a composite material. The composite produced thereby was a monolithic silica gel matrix with homogeneously distributed oxide powders with mechanical properties equivalent or superior to Portland cement based concrete.

The curing time of the silica sol-based composite of Hench et al was substantially more rapid than Portland-cement based concrete. However, the percentage of oxide powders contained within the silica sol based composite is limited to 1% to 10% by weight, the remainder being silica gel which requires heating the composite to elevated temperatures greater than 700° C. for drying and stabilization. The low concentration of oxide powders in the silica sol and high temperatures required for stabilization and densification and cost of the silica alkoxide precursors do not make this type of process economically suitable for replacement of Portland cement based structural materials.

More technological innovation is needed to provide stronger, lighter, cheaper, and more reliable structural materials that can replace and surpass the existing use and reliance on Portland cement and the manufacture thereof to significantly reduce the carbon footprint of the manufacture of cement-based structural materials.

SUMMARY OF THE INVENTION

It is a primary objective of the present invention to provide a method and process for manufacturing structural products with negligible emission of carbon compounds.

A second objective of the present invention is to provide a method and process for manufacturing structural products whereby the surface area of alumino-silicate based powders are greatly increased and rendered chemically active so that when the functionalized powders are mixed with water, polycondensation reactions occur between the surfaces of each powder in the mixture and binds the powders together to form a structural material.

A third objective of the present invention is to provide a method and process whereby the surface functionalized powders can be mixed with an additive and a dry aggregate, such as sand, and water to make a slurry that can be poured or cast into any desired shape and rapidly cured to a hardened shape suitable for use as a structural material.

A fourth objective of the present invention is to provide structural products and materials with the mechanical strength equivalent to Portland-cement based concrete products.

A fifth objective of the present invention is to provide structural products and materials that can be poured, molded and cast in any desired shape.

A sixth objective of the present invention is to provide structural products and materials that can be mixed with cement and sand and poured, molded and cast in any desired shape.

A seventh objective of the present invention is to provide a method for nano-functionalization of Fly Ash and sand or silica to increase and enhance the reactive surface of each material on a nanometer scale.

A eighth objective of the present invention is to provide a method for foamed functionalization of fly ash by the addition of a organic-silicate compound that increases strength of the structural product and renders the structural product water insoluble.

A ninth objective of the present invention is to provide a light weight structural material having a weight in a range of 15 to approximately 25 grams that can bear a load weight of from approximately 1 to 2 tons without cracking or fracturing.

A preferred process and method for preparing functionalized alumino-silicate powders includes, selecting an alumino-silicate based powder having a plurality of particles, treating the powder with a liquid reagent to form mixture (I) wherein the powder becomes functionalized with each particle having a chemically active surface area, drying the functionalized powder particles so that when the dried functionalized powder is mixed with water, polymerization reactions occur between the surfaces and bind the particles together to form a structural material with no emission of carbon compounds. The preferred alumino-silicate based powder is one of industrial power plant fly-ash, mining tailings, sand and mixtures thereof.

The preferred liquid reagent for treating the alumino-silicate powders is sodium hydroxide (NaOH), and a mixture of ethylene glycol and acid. More preferably, treating of the powder with a liquid reagent, further includes refluxing, stirring and distilling the mixture (I) at temperatures in a range between approximately 120° C. to approximately 150° C., for a time period from approximately 4 hours to approximately 24 hours.

A preferred structural product prepared from functionalized alumino-silicate powders includes, a plurality of particles with a greatly increased, chemically active surface area that forms a dry aggregate that is mixed with water to form a pourable slurry that is cast into a desired shape and rapidly cured to a hardened shape suitable for use as a structural material.

Another preferred process and method for preparing functionalized alumino-silicate powders includes, selecting an alumino-silicate based powder having a plurality of particles, mixing the powder with a liquid reagent to form mixture (I), refluxing and stirring mixture (I) continuously for 24 hours to form mixture (II) with surface activated powder particles, washing mixture (II) with water to remove residual liquid reagent and drying the washed mixture (II) in an ambient atmosphere, adding the dried surface activated powder from mixture (II) to a distillation process for a period of time sufficient to create functionalized alumino-silicate powders with chemically active alkoxide sites on each particle surface. It is also preferred that the alumino-silicate based powder is industrial power plant fly-ash, mining tailings, sand and mixtures thereof and the preferred liquid reagent is sodium hydroxide (NaOH), more preferably, a 10 molar solution of NaOH.

It is also preferred that the refluxing and stirring of mixture (I) occur at a temperature of approximately 120 degrees C. and that the preferred distillation process includes a solution of concentrated sulfuric acid in anhydrous ethylene glycol prepared that is heated to approximately 150 degrees C. under inert gas flow and more preferably that the distillation process proceeds for at least approximately 4 hours while the pH is maintained at approximately 2.

A further preferred step includes washing the functionalized powder with anhydrous ethanol until the eluant reaches a pH of approximately 5, then preferably, the washed functionalized powder is dried and stored in a sealed container and preferably, the drying occurs at a temperature of approximately 50 degrees C.

Another preferred process and method for preparing functionalized alumino-silicate powders includes, selecting an alumino-silicate based powder, mixing the powder with an alcohol/acid solution at low temperatures to form mixture (I), transferring mixture (I) to a reactor containing an organic solvent for esterification and distillation to form a functionalized alumino-silicate powder in a slurry, removing water and alcohol from the reactor, separating the functionalized alumino-silicate powders from the slurry by filtering and evaporating residual liquids to produce dried functionalized alumino-silicate powders with chemically active sites on their surface.

Preferably, the alumino-silicate based powder to be functionalized is industrial power plant fly-ash, mining tailings, sand and mixtures thereof. The preferred alcohol/acid solution is ethylene glycol/sulfuric acid that is mixed with the alumino-silicate based powder at temperatures of approximately 0 degrees C. followed by the use of toluene as the preferred organic solvent for esterification and distillation.

A preferred structural composition, product and material is made by the process and method described herein.

A preferred process and method for preparing nano-functionalized alumino-silicate powders includes, selecting a bulk amount of an alumino-silicate based powder having a plurality of particles, dissolving the bulk powder in a hydrofluoric acid solution to form mixture (IV) containing dissolved powder and un-dissolved precipitate, separating the dissolved powder in HF solution from the un-dissolved precipitate for further processing wherein the dissolved powder is treated in a first processing sequence and the un-dissolved precipitate is treated in a second processing sequence, whereas, in the first processing sequence, the dissolved powder is re-precipitated using sodium hydroxide to produce a mixed hydroxide system of minerals, the mixed hydroxide system of minerals is functionalized, a nano-sized plurality of white colored bulk functionalized product is recovered from the first processing sequence, and in the second processing sequence, the un-dissolved precipitate is an alumino-silicate based powder with low aluminum content, the precipitate with low aluminum content is functionalized, a nano-sized plurality of light grey colored functionalized product is recovered from the second processing sequence, and the alumino-silicate based powder from the first processing sequence and the second processing sequence is nano-functionalized to form a ultrafine, bulk powder with nano-sized particles.

It is also preferred that the alumino-silicate based powder is industrial power plant fly-ash, mining tailings, sand and mixtures thereof.

Further objects and advantages of this invention will be apparent from the following detailed description of the presently preferred embodiments, which are illustrated schematically in the accompanying drawings.

DESCRIPTION OF THE PREFERRED EMBODIMENTS

Figure 1:
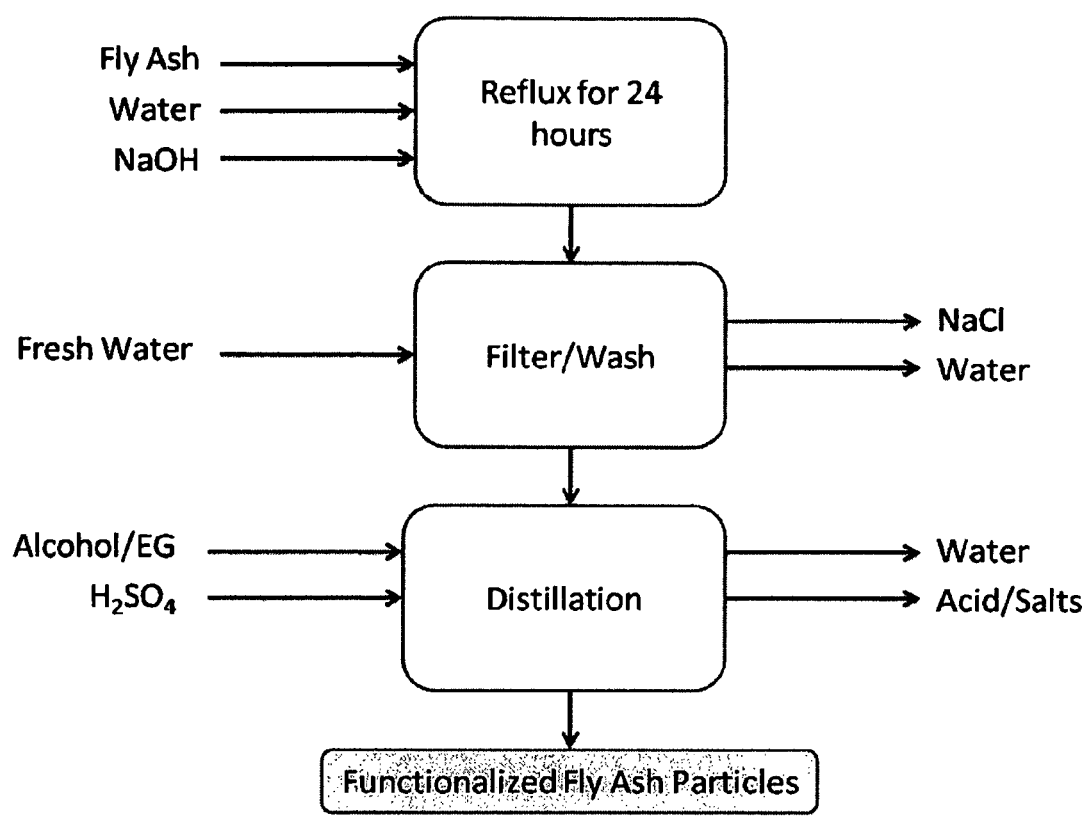
FIG. 1 is a schematic flow chart of the sequence of a first embodiment of a process (A) used to prepare functionalized fly ash particles with negligible carbon emissions.

Before explaining the disclosed embodiments of the present invention in detail, it is to be understood that the invention is not limited in its application to the details of the particular arrangements shown since the invention is capable of further embodiments. Also, the terminology used herein is for the purpose of description and not of limitation.

It would be useful to discuss the meaning of some words and phrases used herein to explain the invention in greater detail.

"Functionalization" is used herein to mean the attachment of desired reactive chemical groups to particle surfaces and is achieved in processes described in Examples 1 and 2 herein.

"Foamed Functionalization" is used herein to mean the attachment of desired reactive chemical groups to particle surfaces resulting in a foamed material as described in Example 6.

"Nanofunctionalization" is used herein to mean the attachment of desired reactive chemical groups to ultra fine, nano-sized particle surfaces as in the process described in Example 4.

According to the present invention, the objectives stated above are met by preparing surface activated, functionalized alumino-silicate raw materials in powder form with a large surface area and a high area density of chemically active sites that lead to rapid polymerization and binding of the powder surfaces when mixed with water with the resultant hardened material having properties equivalent to Portland cement-based concrete without release of carbon compounds characteristic of the manufacture of Portland cement.

The increase in surface area of Fly Ash and Sand and its variants are significant to the technical advances obtained by the present invention. Table I below provides a reference point for discussion of the magnitude of the increase in surface area for functionalized Fly Ash and Sand used in the present invention.

TABLE 1

Surface Area of Fly Ash and Sand

| MATERIAL | SURFACE AREA |
| --- | --- |
| Untreated Fly Ash | 3-4 $m^2$/gm |
| Functionalized Fly Ash | 35-50 $m^2$/gm |
| Untreated Sand | 2-4 $m^2$/gm |
| Functionalized Sand | 5-10 $m^2$/gm |
| Functionalized (Fly Ash + Sand) | 15-25 $m^2$/gm |

Table 1 shows that when the surface area of Fly Ash is functionalized, the surface area increases more than 10 to 15 fold. When sand is functionalized, the surface area is increased more than 2 to 5 fold. A combination of functionalized Fly Ash and functionalized Sand provides an overall increase in surface area that is greater than five fold over that of the individual materials. The increased surface area is also chemically reactive.

The reason for nano-functionalization is to create ultra-fine particles that create stronger bonds between fly ash particles. The initial functionalizing of fly ash particles causes each particle surface to become reactive so that the surfaces bond with each other. Conceptually, the microstructure of such a bonded material could look like closely-packed spheres, plates, or other irregular particle shapes where the particles are bonded to each other at the points where they are in contact, but there is empty space between the particles where they are not touching. The nano-functionalized particles are so small that they can fit inside those spaces between the larger fly ash particles, and act like additional "glue" to bond the fly ash particles together to provide additional strength.

For purposes of illustrating the present invention, but not as a limitation, six embodiments are described herein.

First Embodiment—Functionalization Process No. 1

The method of the present invention contemplates starting with an alumino-silicate based raw material in powder form, such as industrial power plant fly ash or mining tailings. In step one, the raw materials are mixed with an alkaline aqueous solution and refluxed at 120° C. while stirring continuously, as shown in FIG. 1. The surfaces of the alumino-silicate based powders are converted during this Process Step 1 reaction to chemically activated surfaces. After the Process Step 1 reaction, in Process Step 2 the activated powders are filtered and washed with fresh water to remove residual alkali, in the form of sodium chloride (NaCl). The soluble alkali washed from the powder is recycled for use in subsequent batches to eliminate any negative environmental impact of the process.

After step 2, powders, with chemically activated particle surfaces, are dried in an ambient atmosphere at low temperatures of approximately 50° C. with moisture monitoring to assure the powders are dry and remain dry before proceeding to Process Step 3, wherein a final wash with an alcohol, such as ethylene glycol (EG), is used to assist with water removal and drying, although it is not essential.

The activated surfaces are subsequently converted in Process Step 3 to functionalized alkoxide surfaces that possess a very high area density of chemically active sites, such as silanols (SiOH) and meta-stable tri-siloxane rings ($Si_3$—$OH_3$) and hydrated aluminate species (AlOH).

In Process Step 3, a solution of concentrated sulfuric acid and anhydrous ethylene glycol is prepared and heated in a distillation apparatus under inert gas flow until slow distillation begins. The activated powders from Process Steps 1 and 2 are mixed into the solution while stirring continuously and the mixture is brought back to gentle distillation. After a few minutes the solution pH is adjusted to a value of approximately 2. Distillation proceeds while the pH is maintained at approximately 2, adding additional acid if necessary. The chemical reactions occurring during this process create a functionalized alkoxide surface on the powders with a high area density of chemically active sites.

Following the functionalization reaction the mixture is filtered and the powder is washed with anhydrous ethanol or other appropriate alcohol until the eluant reaches a pH value of 5 or greater. The washed functionalized powder is further dried and stored in a sealed container.

The functionalized powder can be used for all the same purposes as Portland cement, such as making concrete and mortars, but without emission of carbon dioxide during its manufacture. The functionalized powder can be used itself to make structural materials or mixed with Portland cement and sand in order to achieve a wide range of mechanical properties and curing times.

Second Embodiment—Functionalization Process No. 2

Figure 2:
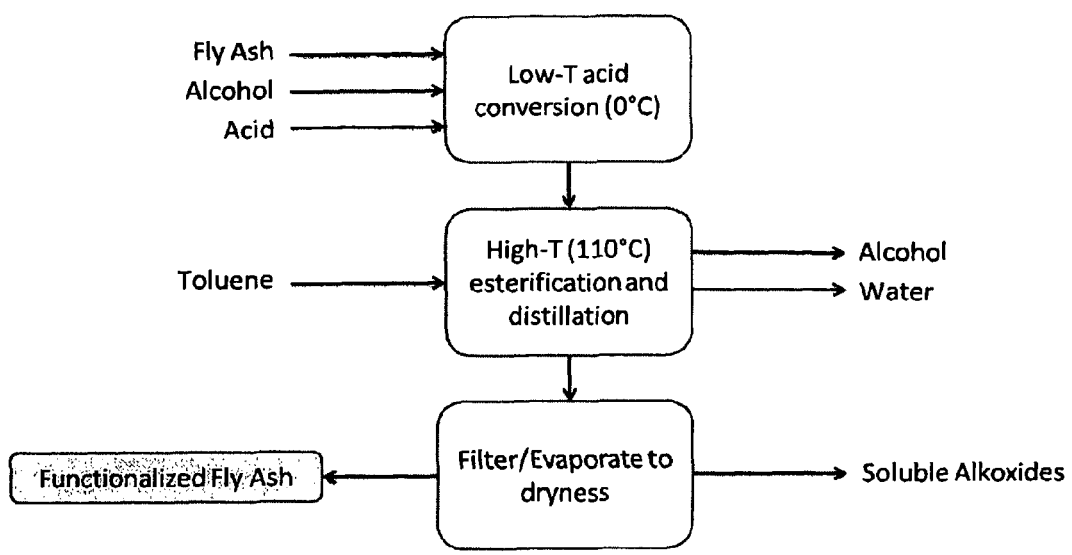
FIG. 2 is a schematic flow chart of the sequence of a second embodiment of a process (B) used to prepare functionalized fly ash particles with negligible carbon emissions.

This embodiment of the present invention is shown in FIG. 2 and contemplates starting with Process Step 1 with an alumino-silicate based raw material in powder form, such as industrial power plant fly ash or mining tailings. The raw materials are mixed with an alcohol/acid solution at low temperatures of near 0° C. The chemical reactions in Process Step 1 result in surface activation of the alumino-silicate powders. After the surface activated powders are functionalized in Process Step 2 by reacting them with toluene or other appropriate chain organics at moderate temperatures of greater than 100° C. subjecting the functionalized powders to esterification and distillation; the alcohol and water are removed from the system. In Process Step 3 the functionalized alumino-silicate powders are filtered and residual liquids are evaporated to produce dried functionalized powders.

Soluble alkoxides are removed from the system during evaporation and are a valuable by-product of functionalization as described in Functionalization Process No. 2 and comprise an important part of this invention.

The functionalized powder can be used for all the same purposes as Portland cement, such as making concrete and mortars, but without emission of carbon dioxide during its manufacture. The functionalized powder can be used itself to make structural materials by mixing with an aggregate and water or mixed with small quantities of Portland cement and an aggregate in order to achieve a wide range of mechanical properties and curing times.

An example of using the novel functionalized powder produced by either functionalization process in Example 1 or in Example 2 to make a typical strong structural material follows.

The dried functionalized powder can be mixed with an additive to accelerate the surface polycondensation reactions. A typical additive can be Portland cement at a ratio of 80% functionalized powder and 20% Portland cement (by weight). A dry aggregate is intimately mixed with the two powders for a short time. A typical aggregate can be builder's sand added at a ratio of 0.6-1.0 to the powders. Water is added to the mixture of functionalized powder+additive+aggregate and mixed until the desired consistency is reached for pouring or casting into molds. Pouring or casting should be done within 10 minutes of mixing. The poured or cast structural material is allowed to cure at a moderate temperature of 60-80° C. for two or more days. Compressive strengths of approximately 3,000 pounds per square inch (psi) or greater are obtained for the novel structural materials made by the above process.

Third Embodiment—Geo-polymerization

The present embodiment follows a modified geo-polymerization route demonstrated by Davidotis et al in U.S. Pat. No. 5,342,595 (1994) supra and Jaarsveld et al in *Chemical Engineering Journal* (2002) supra. However, the present process is significantly varied to accommodate fast mineralization of the Fly Ash in a one step process in which the fly ash is mixed with various precursors and with high concentration alkali that forms the amorphous zeolites which are hard and strong. This process is in contrast to the prior art that uses three or more process steps.

Fourth Embodiment—Nanofunctionalization of Fly Ash

This embodiment is shown in FIGS. 7 and 8A-8E, 9 and 10 and contemplates starting with an aluminosilicate powder such as fly ash and dissolving components of the powders in hydrofluoric acid. The treatment/dissolution in hydrofluoric acid produces a mixed hydroxide system of minerals wherein the dissolved portion of the fly ash hydrofluoric acid solution and the un-dissolved precipitate after the hydrofluoric acid treatment are separately processed. The dissolved portion of the solution is re-precipitated using sodium hydroxide and subsequently functionalized using processes of the first or second embodiment described above in a first processing sequence. The un-dissolved precipitate does not require re-precipitation and is processed as a fly ash with low aluminum content and functionalized using processes of the first or second embodiment described above in a second processing sequence. The resultant powder from both the first processing sequence and the second processing sequence exhibit bulk powder functionalization at nanoscale and very high chemical activity due to the nanometer scale of functionalization.

Fifth Embodiment—Functionalization of Silica Sand

This embodiment uses the surface functionalization process in Example 1 or Example 2 to render the surface of silica sand (SiO2) chemically active and increase the surface area thereby making the filler material contribute to the surface condensation reactions and structural strength when it is blended with functionalized fly ash in a formulation.

Sixth Embodiment—Foamed Functionalization

This embodiment comtemplates modifying functionalization processes in Examples 1, 2 and 4 by addition of tetraethyl ortho silicate (TEOS) to the functionalized powders and as-received fly ash as an internal binder to provide an organosilicate backbone to the mineral rich matrix. The addition of TEOS to the functionalized mixture increases strength and renders the final product water insoluble. Drying under a low vacuum leads to foaming of the TEOS-powder mixture thereby creating a very high strength and lightweight structural material.

Example I

Functionalizaton Process No. 1 (Alkoxide Surfaces)

The method of the present invention contemplates a three-step process, starting in Process Step 1 with an alumino-silicate based raw material in powder form, such as industrial power plant fly ash or mining tailings, mixing the powders with a 10 molar NaOH aqueous solution and refluxing at 120° C. for 24 hours while stirring continuously. The surfaces of the alumino-silicate powders are converted during this Process Step 1 reaction to chemically activated surfaces.

After the Process Step 1 reaction, in Process Step 2 the activated powders are filtered and washed with fresh water to remove residual NaOH. The NaOH washed from the powders is recycled for use in subsequent batches to eliminate any negative environmental impact of the process.

The chemically activated powders are dried in ambient atmosphere at low temperatures of approximately 50° C. with moisture monitoring to assure the powders are dry before proceeding to Process Step 3. A final wash with ethanol or other alcohols may be used to assist with water removal and drying, although it is not essential.

The activated surfaces are subsequently converted in Process Step 3 to functionalized alkoxide surfaces that possess a high density of chemically active sites, such as silanols (SiOH) and meta-stable tri-siloxane rings ($Si_3$—$OH_3$) and hydrated aluminate species (AlOH).

In Process Step 3 a solution of concentrated sulfuric acid in anhydrous ethylene glycol is prepared and heated to approximately 150° C. in a distillation apparatus under inert gas flow until slow distillation begins.

The activated powders from Process Steps 1 and 2 are mixed into the solution while stirring continuously and the mixture is brought back to gentle distillation. After a few minutes the solution pH is adjusted to a value of approximately 2. Distillation proceeds for at least 4 hours while the pH is maintained at 2; adding additional sulfuric acid is added, if necessary. The chemical reactions occurring during this process create a functionalized alkoxide surface on the powders. Following the functionalization reaction, the mixture is filtered and the powder is washed with anhydrous ethanol or other appropriate alcohol until the eluant reaches a pH of 5 or greater. The washed functionalized powder is further dried at approximately 50° C. and stored in a sealed container. The functionalized powder can be used for all the same purposes as Portland cement, such as making concrete and mortars, but without emission of carbon dioxide during its manufacture.

Figure 3A:
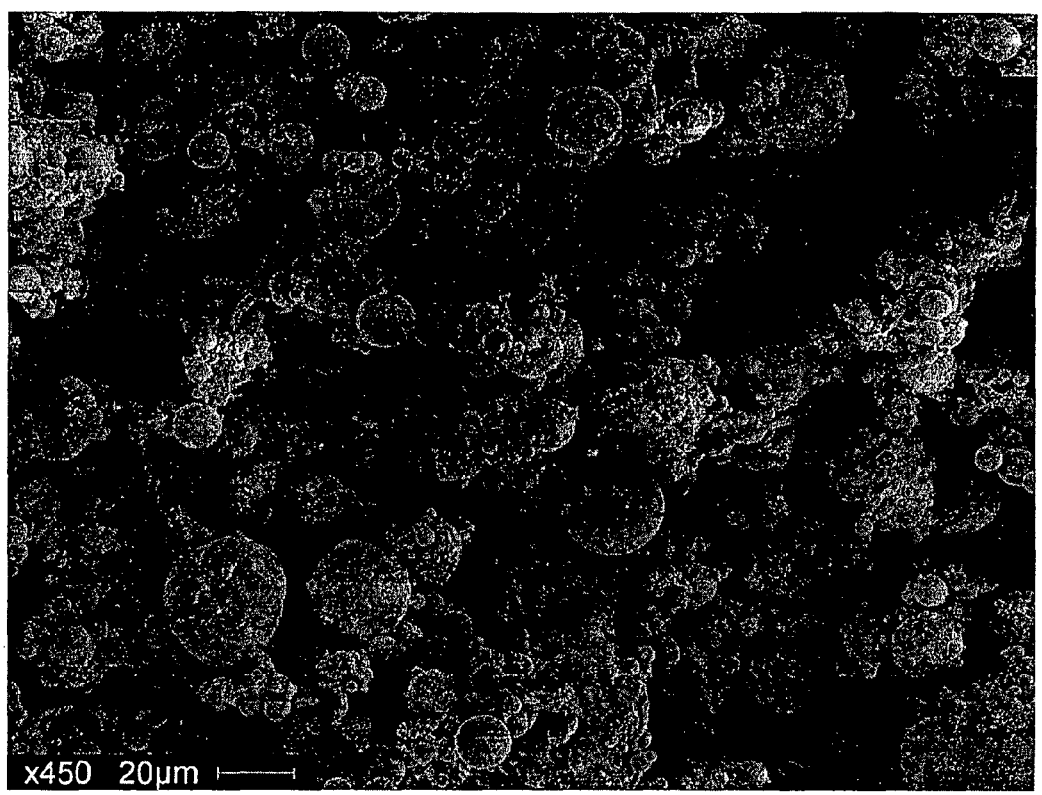
FIG. 3A is a scanning electron microscope (SEM) image of the fly ash raw material before functionalization by Process A.
Figure 3B:
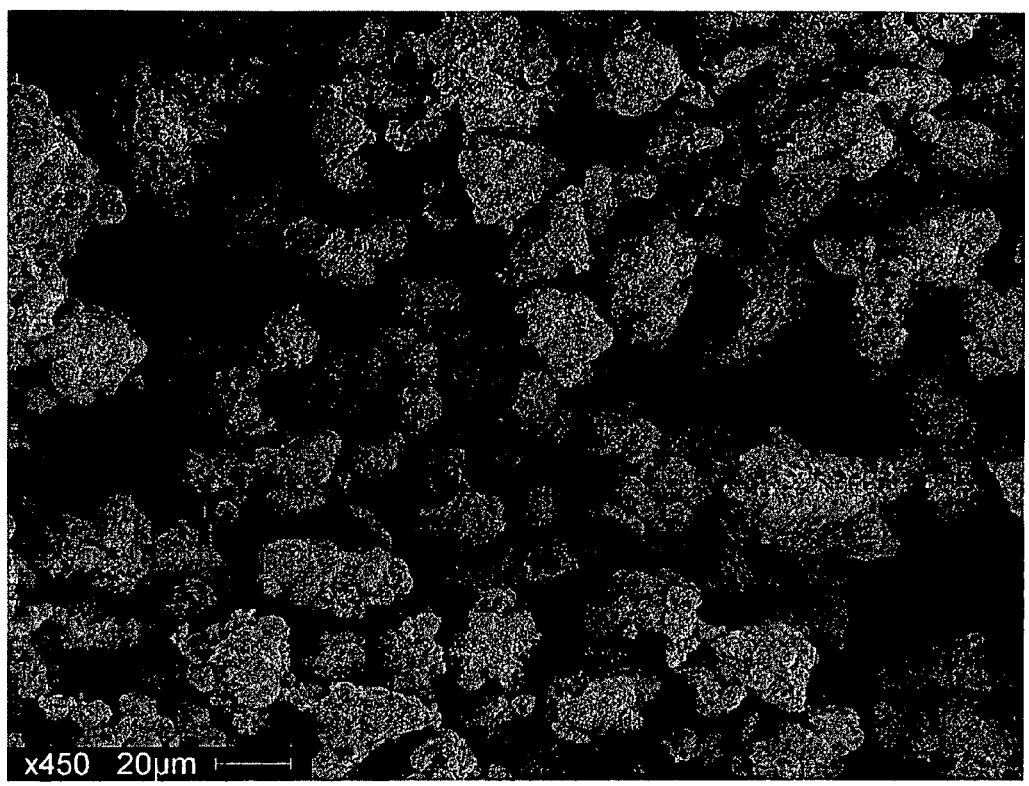
FIG. 3B is a scanning electron microscope (SEM) image of the fly ash raw material after functionalization by Process A.

The functionalized alumino-silicate powders have a greatly increased surface area as is evident in the scanning electron microscope images of the fly ash raw material before functionalization, as shown in FIG. 3A and after functionalization, as shown in FIG. 3B using Functionalization Process No. 1.

Figure 4:
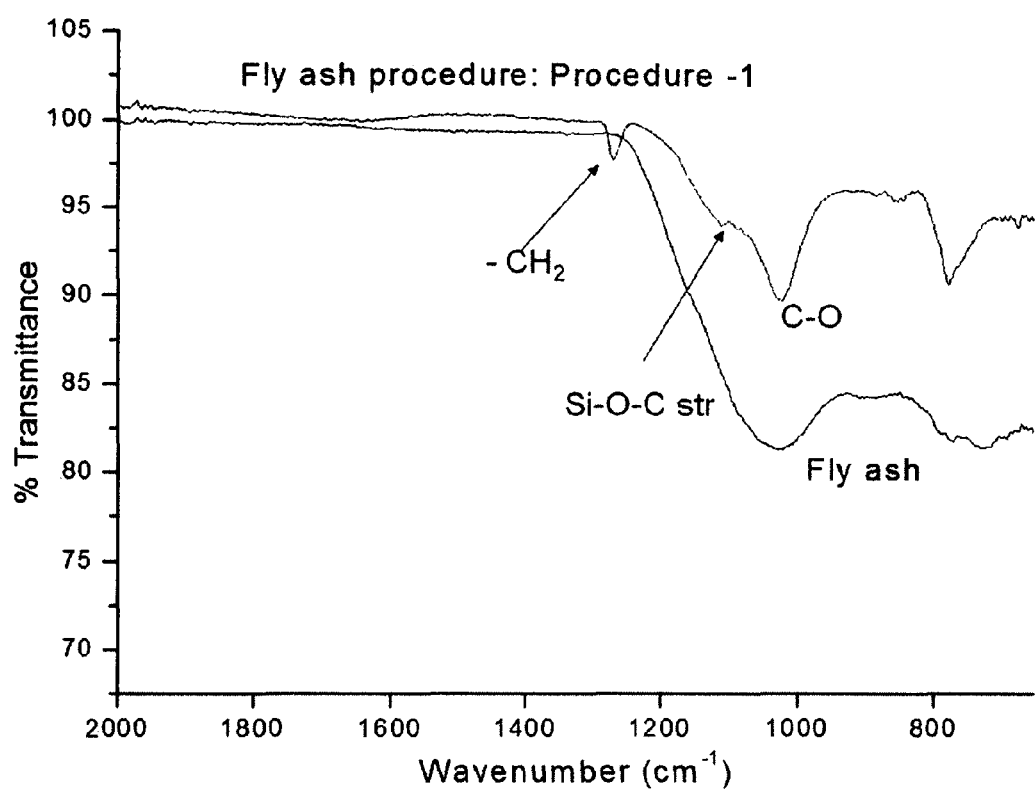
FIG. 4 is a graph of the Fourier Transform Infrared Reference (FTIR) spectra of alumino-silicate powders before and after functionalization.

The functionalized alumino-silicate powders have newly created chemically active alkoxide sites on their surface as is evident from FTIR spectra of the powders before and after functionalization, as shown in FIG. 4. The Si—O—C molecular stretching vibration at 1100 cm-1, the C—O vibration at 1020 cm-1 and the CH2 vibration at 1300 cm-1 are all characteristic of surface alkoxide species created during the surface functionalization process.

Figure 5A:
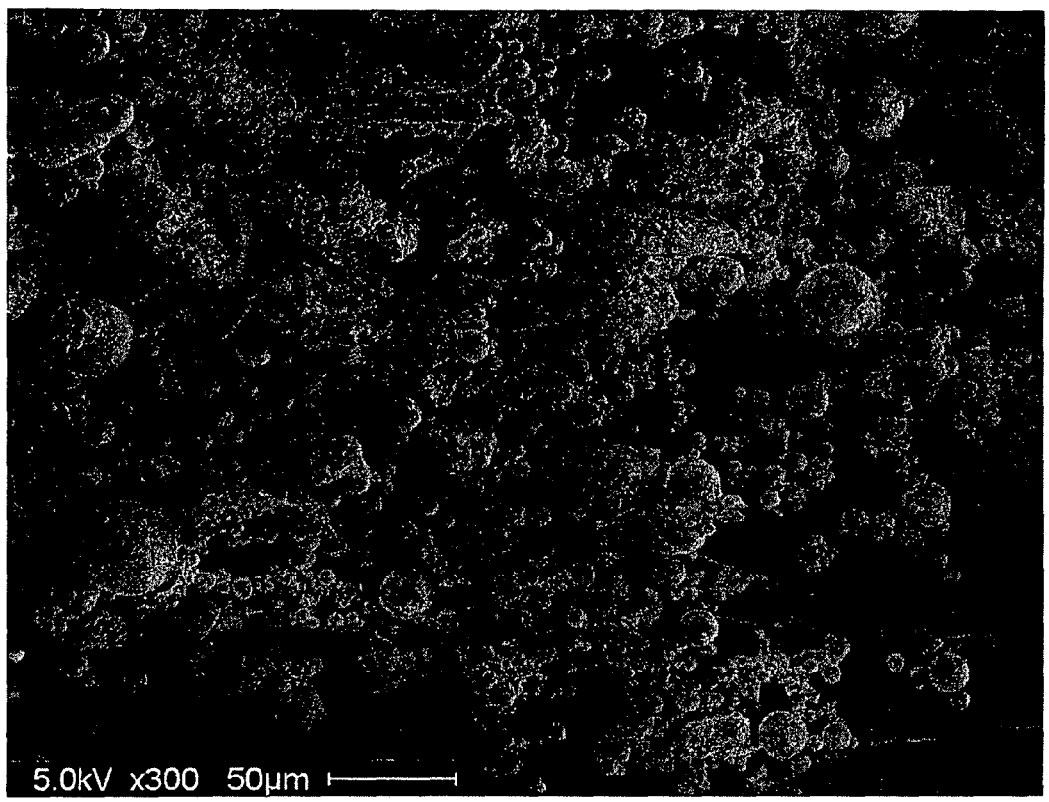
FIG. 5A is a scanning electron microscope (SEM) image of fly ash powders undergoing poly-condensation reactions when exposed to moisture before functionalization.
Figure 5B:
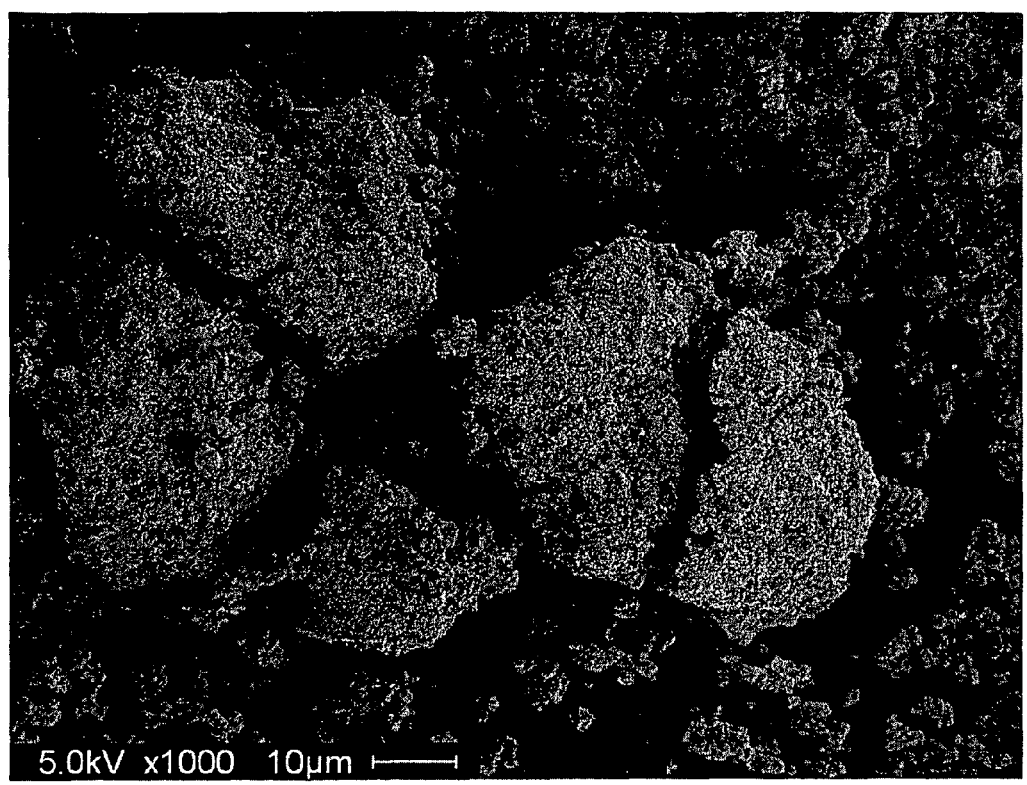
FIG. 5B is a scanning electron microscope (SEM) image of the fly ash powders undergoing poly-condensation reactions when exposed to moisture after functionalization.
Figure 5C:
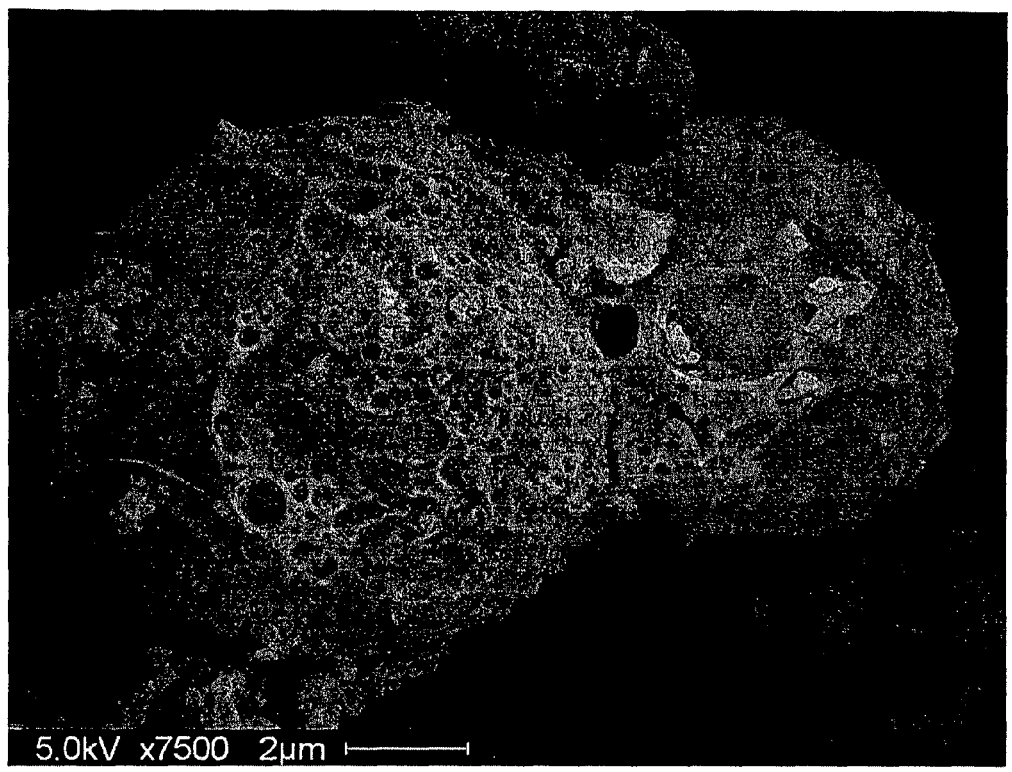
FIG. 5C is undergoing poly-condensation reactions when exposed to moisture before functionalization.

The functionalized fly ash powders with high surface area and chemically active alkoxide species on the surface undergo poly-condensation reactions to bind the powders together when exposed to moisture as is evident from scanning electron microscope SEM images of the powders before functionalization, as shown in FIG. 5A and after functionalization, as shown in FIGS. 5B and 5C. FIG. 5C is a magnification greater than seven fold that of the image in FIG. 5B.

An example of using the novel functionalized powder to make a typical strong structural material follows. The dried functionalized powder can be mixed with an additive to accelerate the surface polycondensation reactions. A typical additive can be Portland cement at a ratio of 80% functionalized powder and 20% Portland cement (by weight). A dry aggregate is intimately mixed with the two powders for a short time. A typical aggregate can be builder's sand added at a ratio of 0.6-1.0 to the powders. Water is added to the mixture of functionalized powder+additive+aggregate and mixed until the desired consistency is reached for pouring or casting into molds. Pouring or casting should be done within a short time, approximately 10 minutes, of mixing.

The poured or cast structural material is allowed to cure at a moderate temperature of 60-80° C. for several days. Compressive strengths of >3,000 psi are obtained for the novel structural materials made by the above process.

Example 2

Functionalization Process No. 2 (Esterification)

The second embodiment of the present invention is also a three-step process, wherein the Process Step 1 starting material is an alumino-silicate based raw material in powder form, such as industrial power plant fly ash or mining tailings. The raw materials are mixed with an alcohol or ethylene glycol/acid solution at low temperatures of near 0° C. The chemical reactions in Process Step 1 result in surface activation of the alumino-silicate powders, and prevent buildup of unwanted by-products. After the reaction in Step 1, the surface activated powders are functionalized in Process Step 2 by transferring the activated slurry into a reactor containing toluene or other appropriate chain organics maintained at moderate temperatures of greater than 100° C. causing esterification and distillation of the surface activated powders which become functionalized before the alcohol and water are removed from the system. In Process Step 3 the functionalized alumino-silicate powders are filtered and residual liquids are evaporated to produce dried functionalized powders.

Example 3

Modified Geo-Polymerization

The raw materials for the process in the present example are industrially obtained fly ash and common chemicals such as calcium nitrate, sodium chloride and polyethylene glycol. It is a one step process in which the fly ash is mixed with various precursors and with high concentration alkali that forms the amorphous zeolites which are hard and strong.

Based upon the initial Al—Si—Ca ratio (obtained by the Energy Dispersive analysis of the as received fly ash) the process calls for mixing of various precursors specifically sodium and calcium. The specific ratio was based upon the observation of Hua and Deventer in "The geo-polymerization of alumino-silicate minerals," *International JL. of Mineral Processing*, 59, 247-266 (2000), and specifically mineral composition stilbite (alumina:silica:calcium oxide=58.47:15.04:7.61) and/or sodalite (alumina:silica:calcium oxide=27.57:21.51:10.76).

Precursors used in the present examples include table salt (sodium chloride) for providing excess sodium content and calcium nitrate for providing desired calcium. A 0.01% by weight of polyethylene glycol (M.W=3400) was used as the binder. The dry precursors were mixed with as obtained fly ash and builder's sand as aggregate in a fixed ratio by weight (fly ash:sand:calcium nitrate:sodium chloride:10M sodium hydroxide=1:1:0.04:0.01:0.4). Addition of an alkali is important for the chemical activation and dissolution of the various oxide minerals. Concentration of alkali can be varied from 5M to 10M. The resultant mixture was mixed until a desired consistency is reached for pouring or casting into moulds.

Figure 6A:
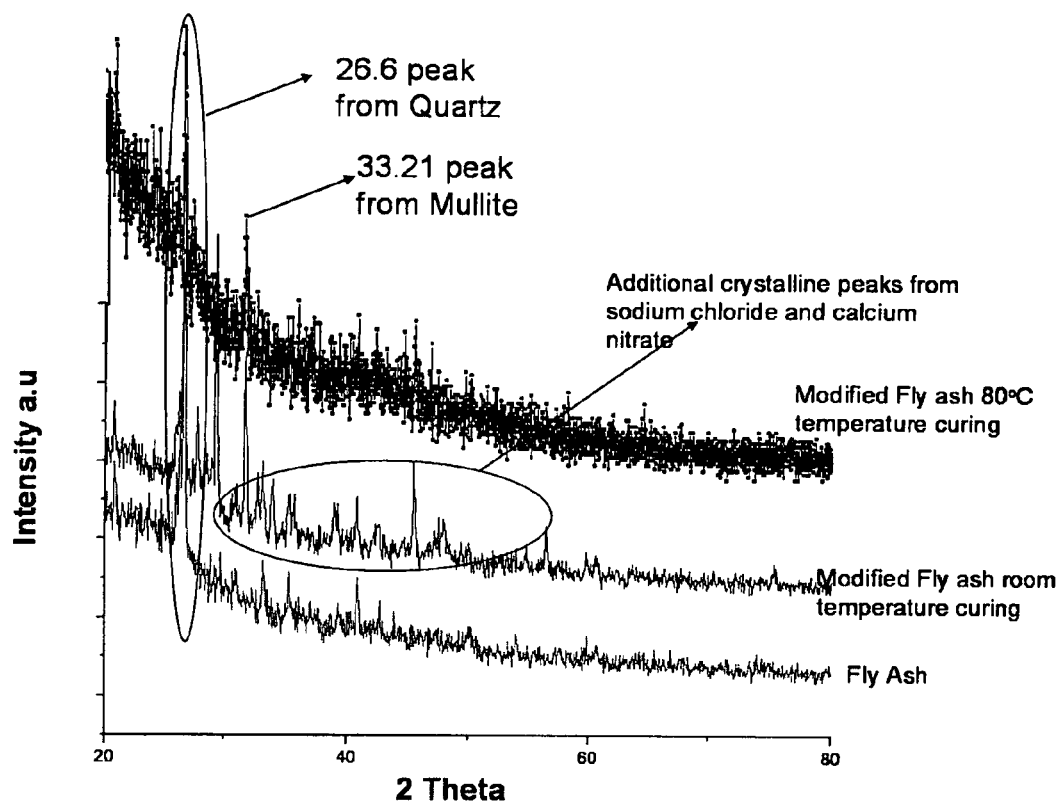
FIG. 6A shows X-ray diffraction (XRD) results of curing at room temperature wherein the resultant aggregate turns into an amorphous or partially amorphous state.
Figure 6B:
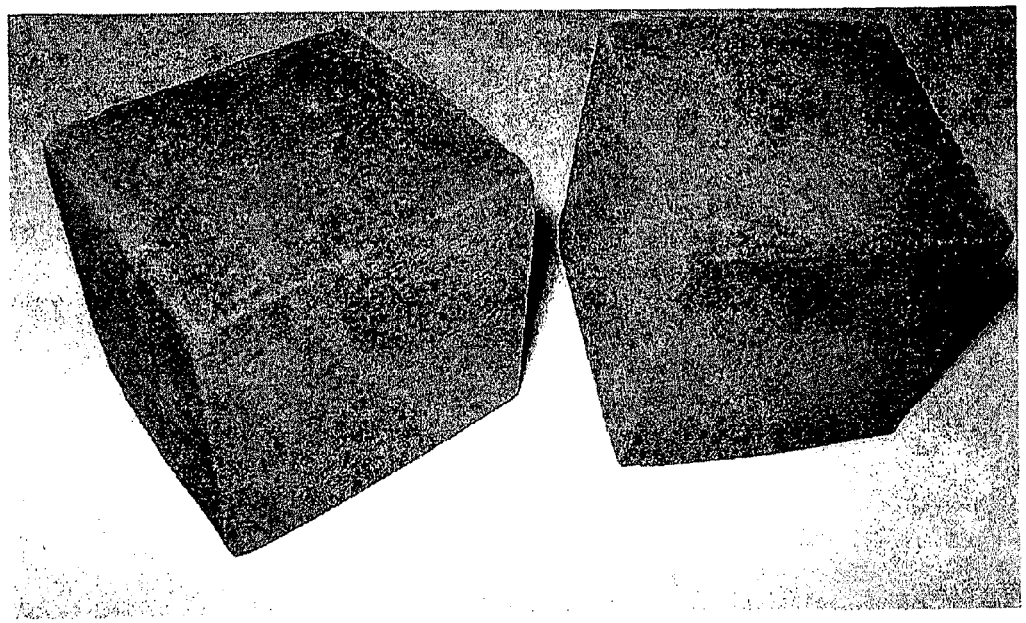
FIG. 6B shows the cube moulds cast from slurry of functionalized alumino-silicate powders of the present invention.
Figure 7:
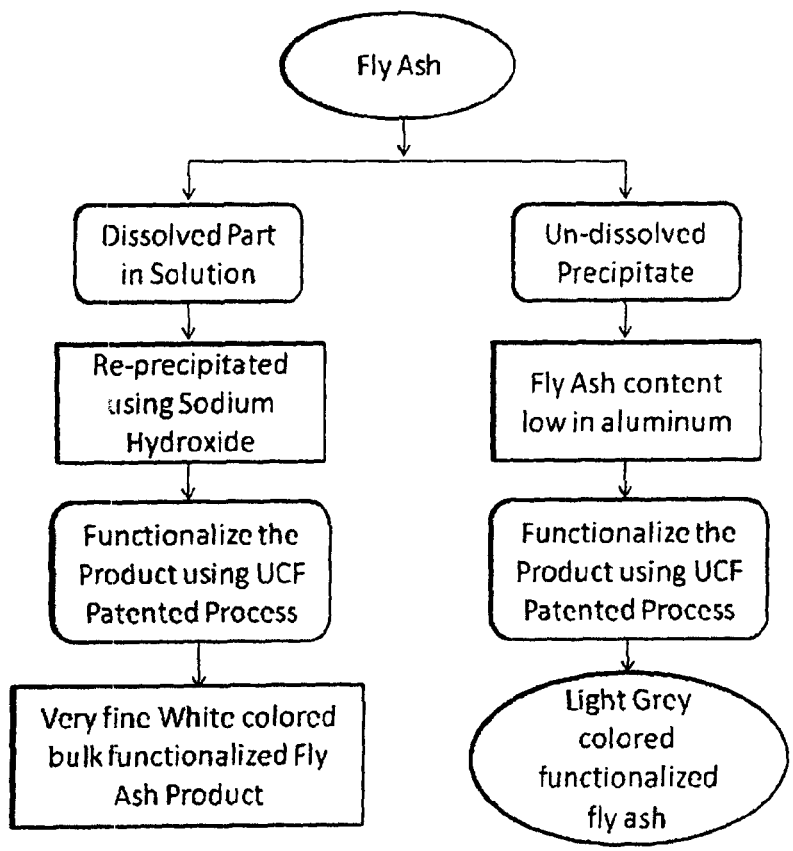
FIG. 7 is a schematic flow chart of the sequence of a third embodiment of a process (C) used to prepare nano-functionalized fly ash.

The poured or cast mineral is allowed to cure at room temperature for 24 hours followed by curing at moderate temperature (80° C.) to allow poly-condensation of minerals. Upon curing, the resultant aggregate turns into amorphous to partially amorphous state as demonstrated by the XRD results in FIG. 6a. The absence and reduced intensity of specific peaks of mullite and quartz from the original fly ash shows that the amorphous state was achieved upon curing at 80° C. for 24 hours. Curing at room temperature does not lead to amorphization as shown by the XRD results in FIG. 6a. The cube moulds cast by the process are shown in FIG. 6b. The process can be used in combination with Example 1 wherein a specific ratio of surface functionalized fly ash can be mixed with non-functionalized fly ash and condensation can be achieved by addition of an alkali like sodium hydroxide.

Example 4

Nano-Functionalization of Fly Ash

The bulk functionalization of fly ash was carried out as an alternative to surface functionalization by dissolving the components of fly ash in 30% hydrofluoric acid (HF). The dissolution of fly ash in HF is followed by re-precipitation using 1-10M sodium hydroxide (or ammonia) produced mixed hydroxide systems of minerals. The bulk mixed hydroxides would be functionalized using a similar procedure as described in detail in the following steps:

Step 1: 200 gms of raw Fly Ash powder was dissolved in 150 ml of hydrofluoric acid (HF). The reaction of HF with the fly ash is extremely exothermic and hence the reaction was carried out in an ice bath using a Teflon® fluoropolymer resin beaker. Hydrofluoric acid (HF) was added in small increments of 10 ml. Reaction was allowed to cease before the addition of next lot of HF. A part of the fly ash is dissolved in HF while rest of it remains as a precipitate. The addition of HF was stopped when no further reaction was observed upon addition of HF.

Step 2: The above solution was separated using a centrifuge and the supernatant (henceforth called as S) was removed from the precipitate (P). Solution S was treated with 10M sodium hydroxide until the precipitation ceases. It was observed that precipitation follows through few stages of color change which suggests the precipitation of various hydroxides/oxides upon addition of NaOH. About 50 ml of NaOH was added to the supernatant S. The resulting precipitate was filtered using 5 micron filter paper and the precipitate was dried without being washed. This will be called supernatant precipitate SP and was yellow in color.

Then, the precipitate P from step 2 was also treated with 10M NaOH. The reaction followed same sequence of reaction as in step 2 and the precipitate was filtered using 5 micron filter paper. The precipitate was dried and no further washing was undertaken. It must be noted that after filtering the resultant solution was tested by adding further sodium hydroxide to ensure complete precipitation of various hydroxides. This will be called PP and was light grey in color.

In the next step, 100 gm of yellow, supernatant precipitate (SP) was treated with 200 ml of butanol and refluxed for 2.5 hours at 130° C. Approximately 10-20 ml of sulfuric acid is added at the start of and during the refluxing treatment to maintain a low pH (less than 2.0) of the solution. The resultant precipitate was filtered using 5 micron filter paper and washed using acetone. It was found that the ethanol reacts with the precipitate and was thus avoided. The powder obtained was white in color. FIGS. 8A-8E show the gradual change in the color of the powder particles as a result of various chemical treatments.

Figure 8A:
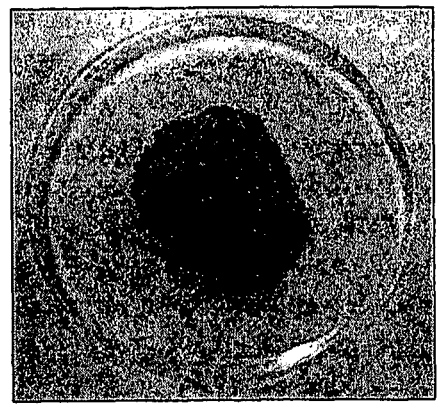
FIG. 8A is a photographic image of untreated Fly Ash as received from a supplier.
Figures 8B, 8C:
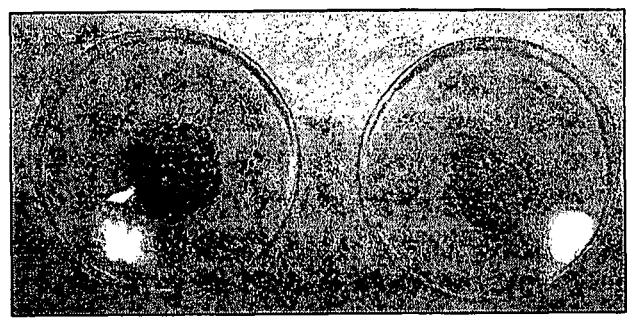
FIG. 8B is a photographic image of un-dissolved Fly Ash from hydrofluoric acid treatment neutralized with sodium hydroxide (NaOH).
FIG. 8C is a photographic image of un-dissolved, nano functionalized Fly Ash.
Figures 8D, 8E:
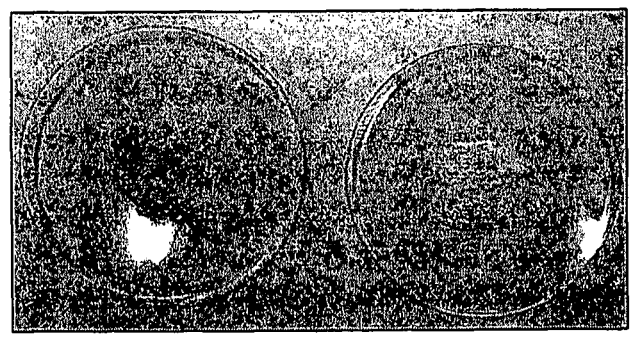
FIG. 8D is a photographic image of dissolved Fly Ash from hydrofluoric acid treatment neutralized with sodium hydroxide (NaOH).
FIG. 8E is a photographic image of dissolved, nano-functionalized Fly Ash.

FIG. 8A is a dark grey colored fly ash as received from a supplier. FIG. 8B shows un-dissolved portion of fly ash after treatment with hydrofluoric acid (HF) and sodium hydroxide neutralization. FIG. 8C shows the un-dissolved fly ash that is nano-functionalized, with ultra-fine particles that are light grey in color. re-precipitated using sodium hydroxide. FIG. 8D shows the light yellow color of the dissolved fly ash that is re-precipitated using sodium hydroxide before treatment with butanol and refluxed with the addition of sulfuric acid. FIG. 8E is the nano-functionalized fly ash with ultra-fine, nano-sized particles that are white in color.

100 gms of the light grey precipitate (PP) which is the un-dissolved precipitate from Step 1 was also processed in a similar manner as 100 gms of SP by refluxing for 2.5 hours in butanol, adding sulfuric acid to maintain a pH value of less than 2.0, filtering and washing the precipitate in acetone. The resultant powder in this case has a lighter grey color than the original grey precipitate (PP).

The initial hydrofluoric acid treatment in Step 1 dissolves some of the oxides in fly ash, but not all of the minerals are dissolved. The un-dissolved portion consists of particles essentially similar to the untreated fly ash, but missing the components that were dissolved in HF. The un-dissolved portion can be functionalized as described in FIG. 7 and the result is similar to the nano-functionalization of fly ash. It is the dissolved portion that is precipitated as ultra-fine, nano-sized hydroxide particles using NaOH. The ultra-fine particles are then functionalized using only Step 2 of the functionalization process since the particles are already hydroxides; the result is the ultra-fine "nano-functionalized" powder shown in FIG. 8E.

Example 5

Functionalization of Silica Sand

The functionalization of sand was achieved using a similar procedure as shown in Example 1. The raw material in this case was only sand or a mixture of fly ash and sand. The principle and the procedure remain the same and prove that the process of functionalization is universal with respect to oxide and mixed oxide surfaces. The end product after step 2 yields a material with significantly higher surface area as listed in Table 1 supra.

Silica sand, in its natural state, does not have a reactive surface, so there is no chemical bonding between the sand and the functionalized fly ash particles. By functionalizing the sand, the same bonds that form between fly ash particles also form between fly ash and sand. The functionalization of sand makes the concrete stronger.

Example 6

Foamed Functionalization of Fly Ash

The rapid mineralization of fly ash can be improved further by addition of Tetraethyl Ortho-silicate (TEOS) as an internal binder which can provide an organo-silicate backbone to the mineral rich matrix and increase the strength of the matrix by manifolds. The addition of TEOS also makes the final component water insoluble rendering an improved performance over conventionally mineralized products. In a typical reaction 15-40% of TEOS can be mixed with 50%-60% of industrially available fly ash and 35-40% silica sand. Additives such as calcium nitrate, sodium chloride and polyethylene glycol (Mol wt 600-3400) could be used as specific agents to obtain 0.2:0.5:0.3 ratio of TEOS:Fly Ash:Additives (including silica sand).

The fly ash used in the process could be as received or the functionalized fly ash as in Examples 1, 2 and 4. The dry precursor mixture was mixed with sodium hydroxide to obtain slurry until a desired consistency is reached for pouring into the moulds. The alkali is important to obtain chemical activation and dissolution of various oxides present in fly ash. The concentration of the alkali was varied from 5-10M and the casted moulds were dried at room temperature for 24 hours followed by drying at 80° C. for another 24 hours. To introduce the porosity in the sample the molds were dried in vacuum. During the drying process and under the vacuum, desired porosity is created in the sample. Another procedure to create vacuum in the sample is to heat the samples above the boiling point of TEOS. The curing time of this process is highly dependent on the additives.

Figure 13:
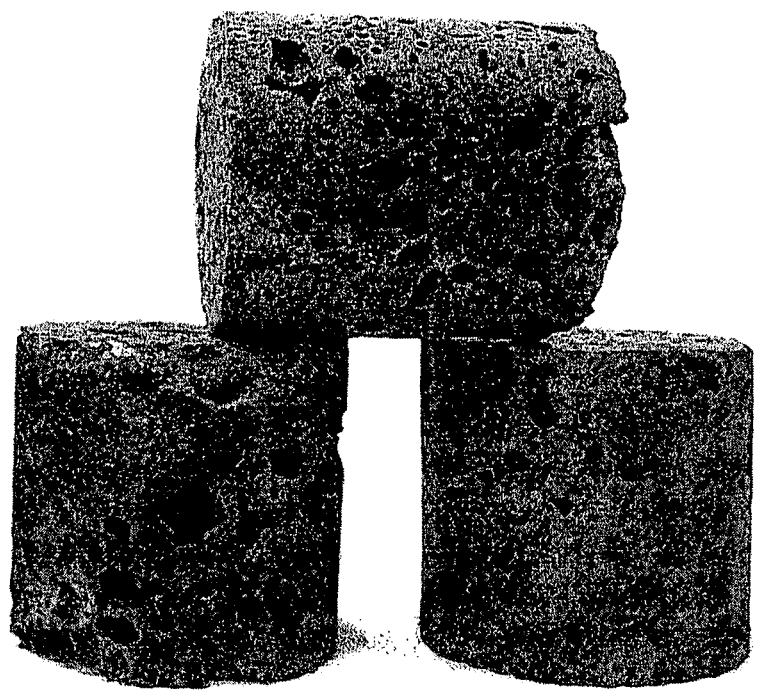
FIG. 13 shows three molded structural pieces prepared by a fourth embodiment of a process (D) used to prepare nanofunctionalized fly ash using foamed functionalization by addition of tetraethyl-ortho-silicate (TEOS).

Alcohols as curing agent—Ethanol can be used for modifying the curing time of the process. Typically the addition of alcohol serves as surfactant to bring TEOS, Fly ash and sodium hydroxide in one phase thereby facilitating the reaction kinetics. Thus, alcohol concentration can be used to control the curing time of the mix. Alcohol concentration in the mixture can be varied from approximately 5% to approximately 25% to alter the curing time from under one minute at the 5% level to several hours at the 25% level. The foaming produces very light weight, porous, structural material as shown, in FIG. 13.

The average weight of a molded cylindrical structural piece that is approximately 1 inch in diameter by approximately 2 inches in height is approximately 18 to approximately 24 grams as compared to a weight of approximately 30 to approximately 40 grams for fly ash and cement based molds of the same dimensions. The foamed material can easily bear the load of a 2 ton vehicle without cracking or fracturing.

In the Examples below the Casting of Molds and Control of Curing Time is discussed.

Example 7

Casting Conventional Molds

Figure 9:
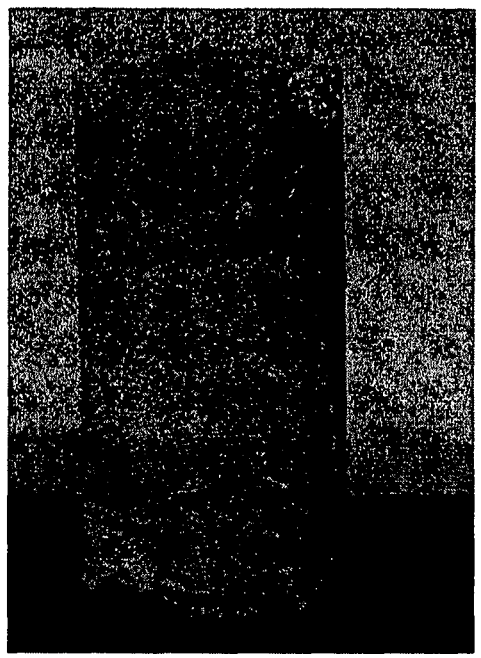
FIG. 9 shows a molded structural piece cast from nano-functionalized fly ash mixed with Portland cement and sand as an aggregate.

Molds were cast using functionalized Fly Ash from both SP and PP. The ratio of Fly Ash to cement was 75:25 and sand was used as an aggregate. To be precise 60 grams Fly Ash+20 grams cement+40 grams of sand was used. It was found that the reaction is extremely exothermic and can produce heat in excess of 60° C. to approximately 80° C. and requires more than control sample to obtain the desired consistency of the slurry to be able to cast into molds. Due to the fast exothermic reaction the casted molds reached a dried state within 5 minutes where it retains the shape. The curing however was done to increase the strength in a moisture controlled environment. The cylindrical molds, measuring 1 inch in diameter and 2 inches in height, were cast as shown in FIG. 9. The curing can be varied by controlling the pH of the final product from 1 minute at high acidic pH (3-5) to 2 days as a completely neutralized product. The molded material in FIG. 9 is created using nanofunctionalized fly ash mixed with regular Portland cement and sand as the aggregate in a 70:30 ratio of nanofunctionalized fly ash to cement, respectively. The strength of the resulting concrete will depend on the drying speed of the concrete. A very fast drying speed as achieved in this mold will result in lowering the strength of the overall concrete. However, by using additives, such as water retardants, the drying can be controlled and the resulting concrete will have very high structural strength.

Example 8

Casting and Curing Cement Free Molds

Figure 10:
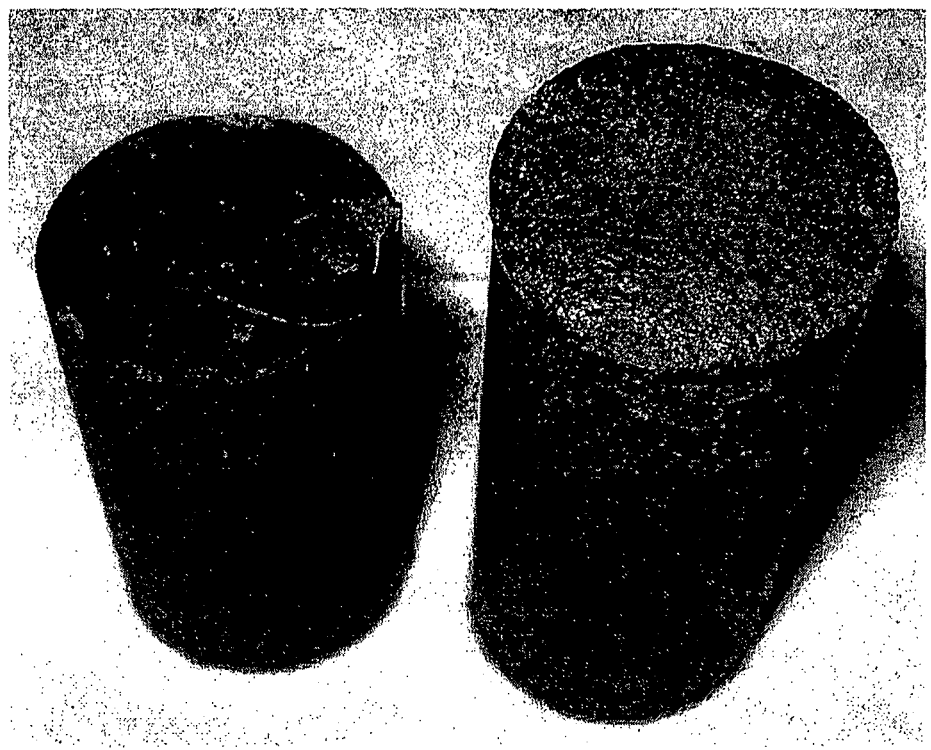
FIG. 10 shows two molded structural pieces from a completely cement free formulation.
Figure 11A:
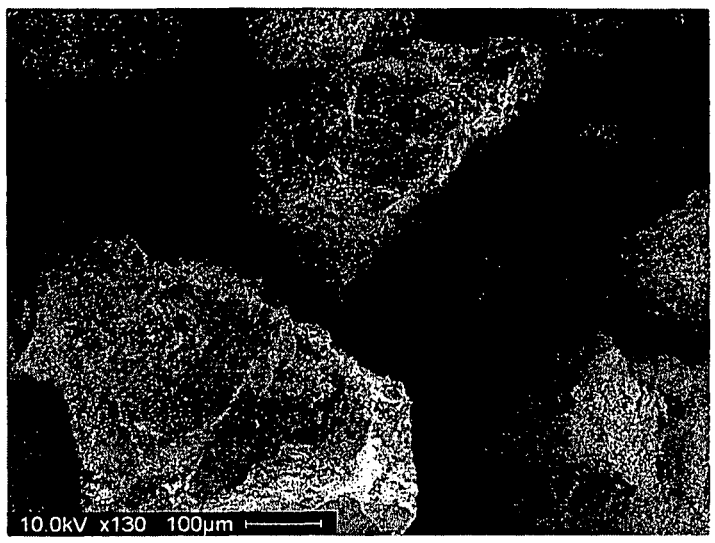
FIG. 11A is a scanning electron micrographic (SEM) image of cast cement free molds at a magnification: 130 times of an area that is 100 µm (microns) in length.
Figure 11B:
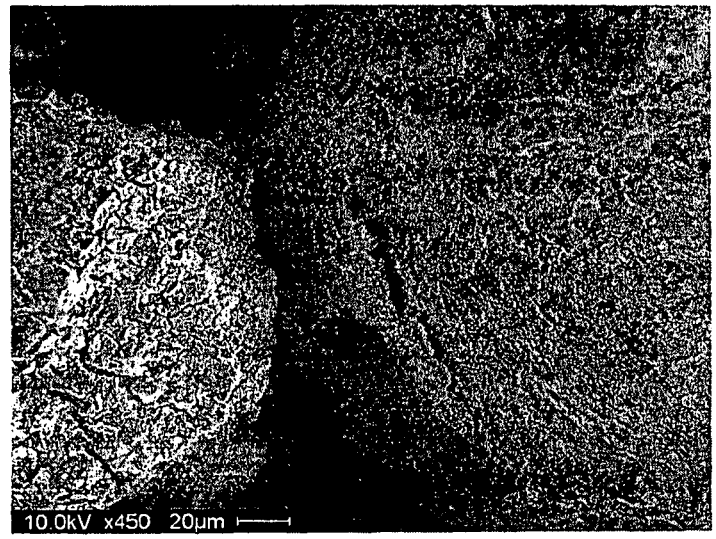
FIG. 11B is a scanning electron micrographic (SEM) image of cast cement free molds at a magnification: 450 times of an area that is 20 µm (microns) in length.
Figure 11C:
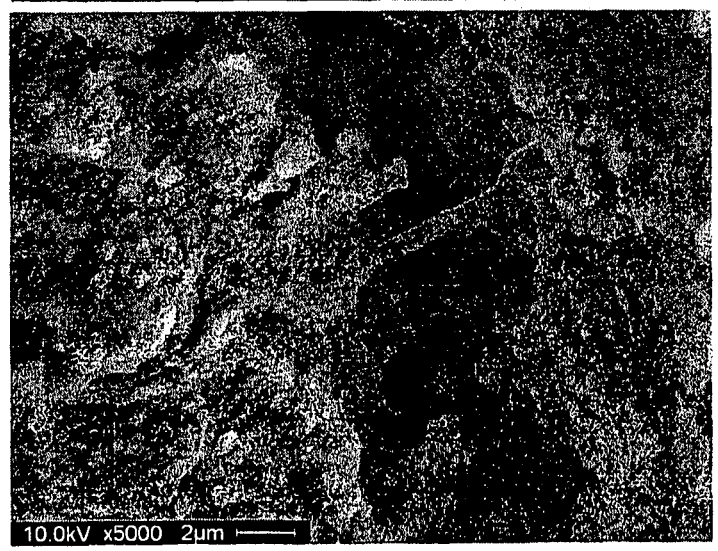
FIG. 11C is a scanning electron micrographic (SEM) image of cast cement free molds at a magnification: 5000 times of an area that is 2 µm (microns) in length.
Figure 12:
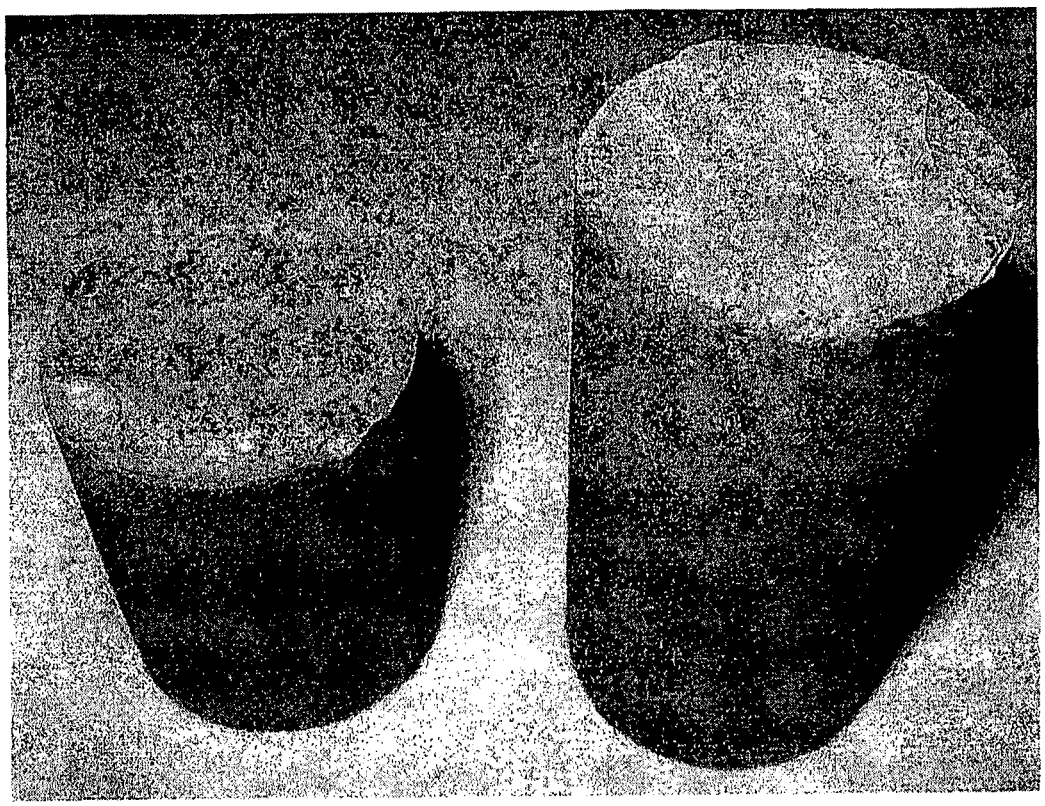
FIG. 12 shows two molds cast from a functionalized mixture of fly ash and silica sand.

Molds were cast using nanofunctionalized fly ash as a binder due to the extremely exothermic reaction during the casting of only nanofunctionalized fly ash. This particular casting used nanofunctionalized fly ash as the binder and filler instead of cement thereby producing a 100% cement free structural material. The molds were casted using 70% functionalized fly ash from Examples 1 and 2 and used 30% nanofunctionalized fly ash from Example 4 and sand was used as filler. The molds from the process are shown in FIG. 10. The curing is followed by increase in volume thereby creating porous product due to reaction between the functionalized and the nanofunctionalized fly ash. The curing can be varied by controlling the pH of the final product from 1 minute at high acidic pH (3-5) to 2 days completely neutralized product A major advantage of the processes and materials of the present invention is the manufacture of structural materials without the release of carbon products into the environment. The present invention also provides structural materials with properties equivalent to Portland cement-based concrete products or mortars and without the emission of carbon compounds characteristic of the manufacture of Portland cement. The invention provides a method for surface activation and functionalization of alumino-silicate based raw materials, such as industrial power plant fly ash or mining tailings, such that the surface functionalized powders can be mixed with aggregates and water to form a hardened material suitable for use in construction. The present invention is destined to have a significant commercial demand.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A process for preparing a structural product, comprising the steps of:
    a) selecting an alumino-silicate based powder from the group consisting of industrial power plant fly-ash, mining tailings, sand, and mixtures thereof;
    b) treating the powder with a liquid reagent to form a mixture (I) wherein the powder becomes functionalized with each particle having a chemically active surface area; and
    c) drying the functionalized powder to produce a dried activated powder; and
    d) contacting the dried activated powder with an alcohol/acid solution to form a structural product with no emission of carbon compounds;
    wherein treating comprises refluxing, stirring, and distilling the mixture (I) at a temperature in a range from 120 ° C. to 150 ° C.

2. The process and method of claim 1, wherein the liquid reagent is selected from at least one of sodium hydroxide (NaOH), and a mixture of ethylene glycol and acid.

3. The process and method of claim 1, wherein refluxing, stirring and distilling the mixture (I) is for a time period from 4 hours to 24 hours.

* * * * *